(12) United States Patent
Petit

(10) Patent No.: US 6,918,514 B2
(45) Date of Patent: Jul. 19, 2005

(54) FLUID DISPENSER PUMP

(75) Inventor: Ludovic Petit, Vitot (FR)

(73) Assignee: Valois SAS, Le Neubourg (FR)

( * ) Notice: Subject to any disclaimer, the term of this patent is extended or adjusted under 35 U.S.C. 154(b) by 0 days.

(21) Appl. No.: 10/414,240

(22) Filed: Apr. 16, 2003

(65) Prior Publication Data

US 2003/0197032 A1 Oct. 23, 2003

Related U.S. Application Data

(60) Provisional application No. 60/387,432, filed on Jun. 11, 2002.

(30) Foreign Application Priority Data

Apr. 19, 2002 (FR) .............................................. 02 05251

(51) Int. Cl.⁷ ............................................... B05B 11/00
(52) U.S. Cl. ................................. 222/321.9; 222/321.2; 239/333
(58) Field of Search .......................... 222/321.5–321.9, 222/321.1, 321.2, 341; 239/329, 331, 333, 337

(56) References Cited

U.S. PATENT DOCUMENTS

| | | | |
|---|---|---|---|
| 2,657,834 A | 10/1953 | Bacheller | |
| 3,940,070 A | 2/1976 | Boris | |
| 5,375,745 A | 12/1994 | Ritsche | |
| 5,579,958 A | * 12/1996 | Su | ........................... 222/321.2 |

FOREIGN PATENT DOCUMENTS

EP 0 493 643 A1 7/1992

* cited by examiner

*Primary Examiner*—J. Casimer Jacyna
(74) *Attorney, Agent, or Firm*—Sughrue Mion, PLLC

(57) ABSTRACT

A manually-actuated fluid dispenser pump including a pump body (10) and at least one piston (50, 55) mounted to slide in leaktight manner in said pump body (10) between a rest position and a dispensing position, said pump being characterized in that the pump body (10) is frustoconical at least in part so as to modify the radial stresses exerted on said at least one piston (50, 55) between said rest position and said dispensing position.

13 Claims, 2 Drawing Sheets

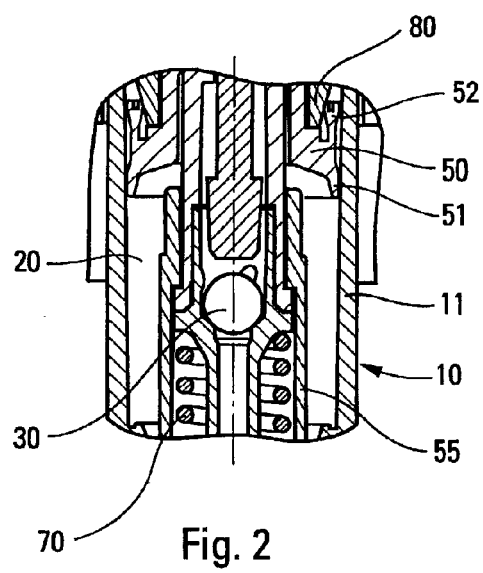
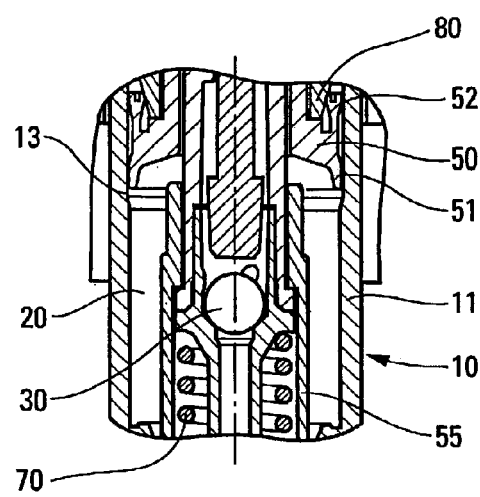
Fig. 2    Fig. 3
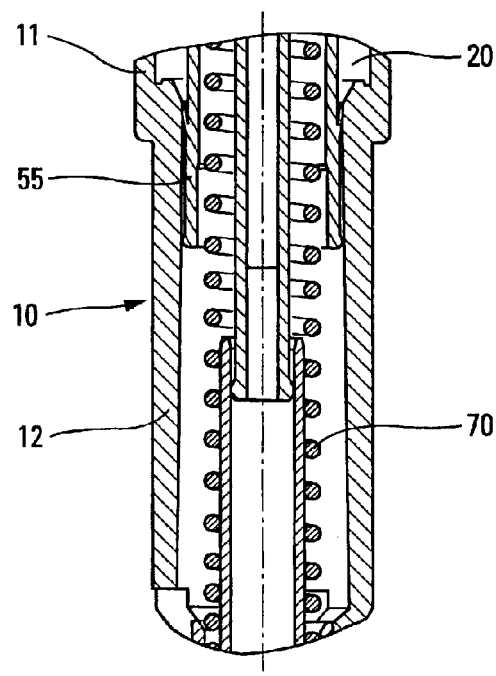
Fig. 4

FLUID DISPENSER PUMP

CROSS REFERENCE TO RELATED APPLICATION

This application claims the benefit under 35 U.S.C. §119 (e) of U.S. provisional patent application Ser. No. 60/387,432, filed Jun. 11, 2002, now abandoned, and priority under 35 U.S.C. §119(a)–(d) of French patent application No. FR-02.05251, filed Apr. 19, 2002.

TECHNICAL FIELD

The present invention relates to a manually-actuated fluid dispenser pump, and to a fluid dispenser device including such a pump.

BACKGROUND OF THE INVENTION

In known manner, a fluid dispenser pump generally includes a pump body in which a piston is mounted to slide between a rest position and a dispensing position. The pump body is cylindrical and the end positions of the piston, namely the rest position and the dispensing position, are defined by various means, e.g. abutment means. When the pump is actuated, the pump chamber is filled with fluid, and the leaktightness constraints for the piston while it is moving inside the pump body are very stringent to avoid any risk of leakage. Therefore, the pump must exert non-negligible radial stresses on the piston while it is moving towards its dispensing position. Unfortunately, most pumps are used at irregular intervals, and the pump spends most of its time in the rest position. The high radial stresses that are exerted on the piston, also when it is in the rest position, can be disadvantageous in that ultimately they can damage the sealing lips of the piston or can deform them, thereby diminishing their leaktightness, which can cause the pump to malfunction. Furthermore, certain pumps use a second piston that is also mounted to move in the pump body between a respective rest position and a respective dispensing position. The second piston is generally mounted to slide in a small-diameter portion of the pump body. In that type of pump, the second piston forms or is connected in some way to the inlet valve and/or the outlet valve of pump chamber. Similarly to what is described above, the pump body is cylindrical and the second piston is mounted to slide in leaktight manner in said cylindrical portion of the pump body between its rest position and its dispensing position. For the second piston, there is a risk that, when it returns from its dispensing position to its rest position, i.e. generally during the stage in which the fluid contained in the pump chamber is expelled, the suction generated by said expulsion inside the pump chamber might cause the inlet valve of the pump to open early, or might cause the outlet valve of the pump chamber to close early, when valve opening and closure is controlled by said second piston. To solve that problem, it is possible to make provision to increase the radial stresses exerted by the pump body on the second piston. However, that requires a larger actuating force to actuate the pump. Such malfunctioning of the valves of the pump chamber can result in non-uniform quantities or "doses" of fluid being dispensed because the times at which said valves open and close are no longer accurately predeterminable and reproducible each time the pump is actuated.

BRIEF SUMMARY OF THE INVENTION

An object of the present invention is to provide a manually-actuated fluid dispenser pump that does not suffer from the above-mentioned drawbacks.

Thus, an object of the present invention is to provide such a dispenser pump that makes it possible to vary the radial stresses exerted on the pistons of the pump between their respective rest and dispensing positions.

An object of the present invention is also to provide such a fluid dispenser pump that guarantees that a dose of fluid is expelled accurately and reproducibly every time the pump is actuated.

An object of the invention is also to provide such a dispenser pump that is simple and inexpensive to manufacture and to assemble.

The present invention thus provides a manually-actuated fluid dispenser pump including a pump body and at least one piston mounted to slide in leaktight manner in said pump body between a rest position and a dispensing position, said pump being characterized in that the pump body is frustoconical at least in part so as to modify the radial stresses exerted on said at least one piston between said rest position and said dispensing position.

Advantageously, said piston is mounted to slide in a pump body portion between the rest position and the dispensing position, the inside diameter of said pump body portion that co-operates with said piston in the rest position being larger than the inside diameter of said pump body portion that co-operates with said piston in the dispensing position, so that the radial stresses exerted by the pump body on said piston are smaller in the rest position.

Advantageously, said pump body portion is frustoconical between the rest position and the dispensing position of the piston.

Advantageously, said pump body portion has a frustoconical portion and at least one cylindrical portion.

Advantageously, said pump body portion is cylindrical starting from the dispensing position of said piston going towards the rest position of said piston, and it has a frustoconical portion before the rest position of said piston.

Advantageously, said piston is mounted to slide in a pump body portion between a rest position and a dispensing position, the inside diameter of said pump body portion that co-operates with said piston in the rest position being smaller than the inside diameter of said pump body portion that co-operates with said piston in the dispensing position, so that the radial stresses exerted by the pump body on said piston are larger in the rest position.

Advantageously, said pump body portion is frustoconical between the rest position and the dispensing position of said piston.

Advantageously, said pump body portion has at least one frustoconical portion and at least one cylindrical portion.

In an advantageous embodiment of the present invention, the pump body has a first pump body portion and a second pump body portion, a first piston being mounted to slide in leaktight manner in said first pump body portion and a second piston being mounted to slide in leaktight manner in said second pump body portion, at least one of said first and second pump body portions being frustoconical at least in part so as to modify the radial stresses exerted on said first piston and/or on said second piston.

Advantageously, the inside diameter of said first pump body portion is larger where the first piston is in the rest position than where it is in its dispensing position, and the inside diameter of said second pump body portion is smaller where the second piston is in the rest position than where it is in its dispensing position.

The present invention also provides a fluid dispenser device including a pump as defined above.

BRIEF DESCRIPTION OF THE DRAWINGS

Other characteristics and advantages of the present invention appear more clearly on reading the following detailed description given with reference to the accompanying drawings which are given by way of non-limiting example, and in which:

FIG. 2 is a detail view on an enlarged scale of a pump in a first variant embodiment of the present invention;

FIG. 3 is a view similar to the FIG. 2 view, showing a second variant embodiment of the present invention; and FIG. 4 is a detail view on a larger scale of another embodiment of the present invention.

DETAILED DESCRIPTION

Figure 1:
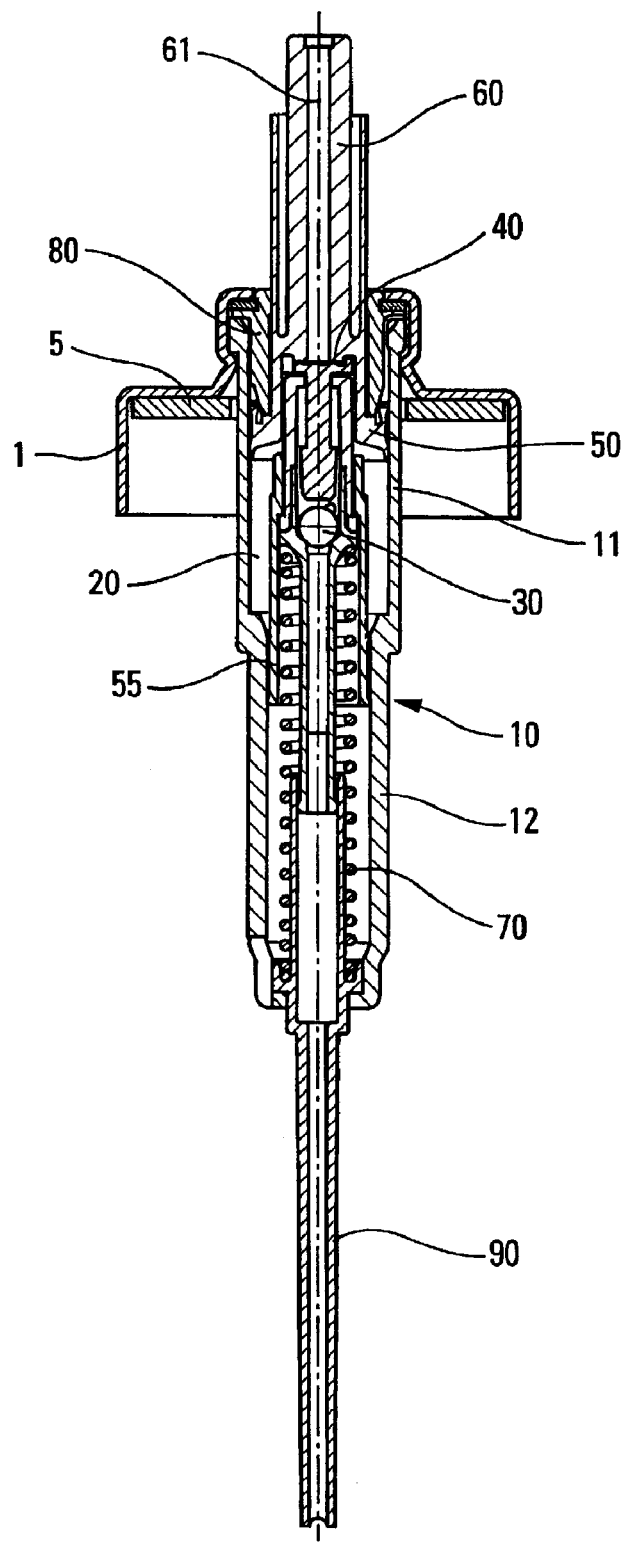
FIG. 1 is a diagrammatic section view of a pump in an advantageous embodiment of the present invention.

FIG. 1 shows a pump including a pump body 10 in which a first piston 50 and a second piston 55 are mounted to slide between respective rest and dispensing positions. The present invention is described below with reference to this particular pump, but it is to be understood that the invention is not limited to the pump shown in FIG. 1. On the contrary, the present invention is applicable to any fluid dispenser pump in which at least one piston is mounted to slide in a pump body. More precisely, although in the pump of FIG. 1, the present invention incorporates two distinct pump body portions with two pistons, each of which implements the present invention, it is quite possible to apply the present invention to pumps having one piston only, or having two pistons but in which only one of said pistons is mounted to slide in a pump body incorporating the present invention.

The pump shown in FIG. 1 thus includes a pump body 10 provided with a first pump body portion 11 in which a first piston 50 is mounted to slide, and with a second pump body portion 12 in which a second piston 55 is mounted to slide. The second pump body portion 12 may have an inside diameter that is small relative to the inside diameter of the first pump body portion 11. Therefore, the second piston 55 may have an outside diameter that is small relative to the outside diameter of the first piston 50. A pump chamber 20 is defined between said pistons 50 and 55, said pump chamber being provided with an inlet valve 30 and with an outlet valve 40. The first piston 50 may advantageously be associated integrally with a preferably hollow actuating rod 60 incorporating an expulsion channel 61 for expelling the fluid. A return spring 70 is generally disposed in the pump body 10, and it advantageously cooperates with the second piston 55 to return the pump automatically to its rest position after each occasion on which it is actuated. A ferrule 80 may be fitted into the top edge of the pump body 10 to define the rest position for the first piston 50, and a dip tube 90 may be assembled to the opposite edge of the pump body 10 so as to extend towards the bottom of a reservoir (not shown). The pump of FIG. 1 may be assembled to a reservoir (not shown) by means of a fixing ring 1 which may be of any type, and in particular screw-fastenable, snap-fastenable, or crimpable. Generally, a sealing gasket 5 is interposed between said fixing ring 1 and the neck of the reservoir (not shown).

In the present invention, at least a portion of the pump body is organized to be frustoconical at least in part, so as to modify the radial stresses exerted by said pump body 10 on said first piston 50 and/or on said second piston 55.

FIGS. 2 and 3 show two variant embodiments of the invention applied to the first pump body portion 11 in which the first piston 50 is mounted to slide. As shown in FIGS. 2 and 3, the inside diameter of the first pump body portion 11 where the piston 50 is in the rest position is larger than the inside diameter of the first pump body portion 11 where the first piston 50 is in the dispensing position. This modification in the inside diameter of the first pump body portion 11 may be obtained by organizing said first pump body portion 11 to be frustoconical between said rest position and said dispensing position, as shown in FIG. 2. In a variant, a cylindrical portion may be provided that extends from the dispensing position towards the rest position of the first piston 50, and before the rest position of the first piston 50 (the position shown in FIG. 3) is reached, the first pump body proportion 11 may be provided with a small frustoconical portion 13. As shown in FIGS. 2 and 3, the first piston 50 is generally provided with two sealing lips, namely a bottom sealing lip 51 and a top sealing lip 52. By means of the present invention, the first piston 50, and in particular its sealing lips 51, 52 are subjected to radial stresses that are lower when the piston is in the rest position. This makes it possible to relieve the force on said sealing lips 51, 52, and thus to increase the life span of the piston, and therefore of the pump.

FIG. 4 shows the second pump body portion 12 in which the second piston 55 is mounted to slide. In this case, the situation is the reverse of the situation described above in that the inside diameter of the second pump body portion 12 at the rest position of the second piston 55 is smaller than the inside diameter of the second pump body portion 12 at the dispensing position of said second position 55. This modification in inside diameter may be obtained by organizing the second pump body portion 12 to be frustoconical between the rest position and the dispensing position of the second piston 55. In a variant, it is possible to provide a plurality of successive cylindrical portions in alternation with a plurality of frustoconical portions. In the embodiment shown in FIG. 4, the aim is to obtain a gradual increase in the radial stress on the second piston 55 as the second piston 55 returns from its dispensing position towards its rest position. In the example described with reference to FIGS. 2 and 3 and concerning the first pump body portion 11, there is no such requirement for the radial stress to be increased or decreased gradually, but rather merely the desire to reduce the radial stresses in the rest position of the first piston 50. The variant shown in FIG. 3, with a small frustoconical portion disposed immediately before the rest position of the first piston 50 and that connects a cylindrical portion to another cylindrical portion is thus quite possible for the first piston 50, whereas, for the second piston 55, it is preferable to obtain a gradual modification in this radial stress. The invention applied to the second pump body portion 12 makes it possible to reduce the risk of malfunctioning of the inlet or outlet valves 30, 40 of the pump chamber 20. Such malfunctioning can occur if the second piston 55 goes back up too rapidly towards its rest position because of the suction generated inside the pump chamber 20 when the fluid is expelled. By gradually increasing the friction on the second piston 55, the present invention almost completely removes this risk without increasing the force required to actuate the pump. It is thus possible to guarantee that the dose dispensed each time the pump is actuated is regular, accurate, and reproducible. Similarly, the fact that the friction is increased while the second piston 55 is going back up towards its rest position causes it to be slowed down, which is advantageous both for dispensing the dose of fluid contained in the pump chamber 20, and also for taking in the next dose from the reservoir (not shown). The reliability of the pump is thus improved.

In the embodiment shown in FIG. 1, when the pump body is made up of two pump body portions of different diameter, in which respective pistons are mounted to slide, it is thus possible to apply the present invention to both of the pump body portions, the inside shape of the pump body then being curved. Thus, starting from the top edge of the pump body, the inside diameter tapers going towards the junction between the first pump body portion 11 and the second pump body portion 12, and then from there, the inside diameter increases again going towards the bottom of the pump body.

Although the present invention is described with reference to various embodiments of it, it should be understood that the person skilled in the art may make any modifications to them without going beyond the ambit of the present invention as defined by the accompanying drawings.

What is claimed is:

1. A manually-actuated fluid dispenser pump, comprising:
   a pump body,
   a first piston mounted to slide in leaktight manner in the pump body between a rest position and a dispensing position for the first piston, and
   a second piston mounted to slide in leaktight manner in the pump body between a rest position and a dispensing position for the second piston; and
   wherein the pump body has a first pump body portion and a second pump body portion, the first piston mounted to slide in leaktight manner in said first pump body portion and the second piston being mounted to slide in leaktight manner in said second pump body portion; and
   wherein first pump body portion is frustoconical at least in part so as to modify the radial stresses exerted on the corresponding first piston between the rest position and the dispensing position for that piston.

2. A pump according to claim 1, in which first piston is mounted to slide in the first pump body portion between the rest position and the dispensing position for that piston, an inside diameter of said first pump body portion where the first pump body portion co-operates with the first piston in the rest position being larger than an inside diameter of said first pump body portion where the first pump body portion co-operates with the first piston in the dispensing position, so that the radial stresses exerted by the pump body on the first piston are smaller in the rest position.

3. A pump according to claim 2, in which said first pump body portion is frustoconical between the rest position and the dispensing position of the first piston.

4. A pump according to claim 2, in which said first pump body portion has a frustoconical portion and at least one cylindrical portion.

5. A pump according to claim 4, in which said first pump body portion is cylindrical starting from the dispensing position of the first piston going towards the rest position of the first piston, and the first pump body portion has a frustoconical portion before the rest position of the first piston.

6. A pump according to claim 1, in which the second piston is mounted to slide in the second pump body portion between a rest position and a dispensing position for that piston, an inside diameter of said second pump body portion where the second pump body portion co-operates with the second piston in the rest position being smaller than an inside diameter of said second pump body portion where the second pump body portion co-operates with the second piston in the dispensing position, so that the radial stresses exerted by the pump body on the second piston are larger in the rest position.

7. A pump according to claim 6, in which said second pump body portion is frustoconical between the rest position and the dispensing position of said second piston.

8. A pump according to claim 6, in which said second pump body portion has at least one frustoconical portion and at least one cylindrical portion.

9. A pump according to claim 1, in which an inside diameter of said first pump body portion is larger where the first piston is in the rest position than where it is in its dispensing position, and an inside diameter of said second pump body portion is smaller where the second piston is in the rest position than where it is in its dispensing position.

10. A fluid dispenser device, comprising a reservoir and the pump according to claim 1.

11. A pump according to claim 1, wherein the first piston is spaced axially from the second piston and slides in leaktight manner with the first pump body portion throughout a complete stroke of the first piston from the rest position to the dispensing position, and wherein the second piston slides in leaktight manner with the second pump body portion through a complete stroke of the second piston from the rest position to the dispensing position.

12. A pump according to claim 1, wherein the second piston cooperates in a leaktight manner with the second pump body in every position between and including the rest position and the dispensing position.

13. A pump according to claim 11, wherein the second piston cooperates in a leaktight manner with the second pump body in every position between and including the rest position and the dispensing position.

* * * * *